(12) United States Patent
Stählin et al.

(10) Patent No.: US 9,541,408 B2
(45) Date of Patent: Jan. 10, 2017

(54) DEVICE AND METHOD FOR ASSOCIATING NEW DATA WITH A DIGITAL MAP

(75) Inventors: Ulrich Stählin, Eschborn (DE); Thomas Grotendorst, Eschborn (DE); Anselm Keil, Hofheim (DE)

(73) Assignee: Continental Teves AG & Co. oHG (DE)

( * ) Notice: Subject to any disclaimer, the term of this patent is extended or adjusted under 35 U.S.C. 154(b) by 155 days.

(21) Appl. No.: 13/321,290

(22) PCT Filed: May 18, 2010

(86) PCT No.: PCT/EP2010/056807
§ 371 (c)(1),
(2), (4) Date: Feb. 6, 2012

(87) PCT Pub. No.: WO2010/133586
PCT Pub. Date: Nov. 25, 2010

(65) Prior Publication Data
US 2012/0131084 A1 May 24, 2012

(30) Foreign Application Priority Data
May 20, 2009 (DE) .................. 10 2009 003 299

(51) Int. Cl.
G06F 15/16 (2006.01)
G01C 21/32 (2006.01)
G09B 29/00 (2006.01)

(52) U.S. Cl.
CPC ............ *G01C 21/32* (2013.01); *G09B 29/004* (2013.01)

(58) Field of Classification Search
CPC ..... G01C 21/30; G01C 21/28; G01C 21/3415;
G01C 21/3461; G01C 21/367; G01C 21/3446; H04L 2209/84; H04L 67/12; H04L 29/08; H04W 4/046
(Continued)

(56) References Cited

U.S. PATENT DOCUMENTS 7,024,307 B2 4/2006 Ito
7,805,242 B2 9/2010 Fujimoto
(Continued)

FOREIGN PATENT DOCUMENTS

DE 102007003147 A1 9/2007
DE 102008012654 3/2009
(Continued)

OTHER PUBLICATIONS

International Application Serial No. PCT/EP2010/056807, International Search Report mailed Sep. 20, 2010, 4 pgs.
(Continued)

*Primary Examiner* — Dhairya A Patel
(74) *Attorney, Agent, or Firm* — RatnerPrestia

(57) ABSTRACT

The present invention describes a method for associating new data with a digital map which is available, preferably locally, in a vehicle, having the following steps: at least one new data value is received from a transmitter which is an element of a vehicle-to-vehicle communication and/or a vehicle-to-infrastructure communication, the new data value is compared with the existing data values from the digital map, and the new data value is added to the digital map or the existing data values are updated with the new data value, in each case on the basis of the result of the comparison. The specified method is used for improving the digital map material. The invention also describes a device for associating new data with a reception device and with a computation device.

14 Claims, 2 Drawing Sheets

(58) Field of Classification Search
USPC .......................................... 709/201, 202, 203
See application file for complete search history.

(56) References Cited

U.S. PATENT DOCUMENTS

| | | | |
|---|---|---|---|
| 8,729,857 B2 | 5/2014 | Stahlin | |
| 8,751,150 B2 | 6/2014 | Stahlin | |
| 2002/0085095 A1* | 7/2002 | Janssen | G01C 15/00 348/148 |
| 2004/0230370 A1 | 11/2004 | Tzamaloukas | |
| 2005/0102098 A1* | 5/2005 | Montealegre | G01C 21/3484 701/533 |
| 2006/0080030 A1 | 4/2006 | Okude | |
| 2007/0219654 A1* | 9/2007 | Frink | G06Q 30/02 700/91 |
| 2008/0015774 A1* | 1/2008 | Donatelli | G01C 21/28 701/118 |
| 2008/0094250 A1* | 4/2008 | Myr | G08G 1/04 340/909 |
| 2008/0162036 A1* | 7/2008 | Breed | G08G 1/161 701/408 |
| 2008/0189035 A1* | 8/2008 | Tsurumi | G09B 29/106 701/437 |
| 2008/0215202 A1* | 9/2008 | Breed | G01C 21/3611 701/25 |
| 2009/0088962 A1* | 4/2009 | Jones | G06F 17/3087 701/519 |
| 2009/0125235 A1* | 5/2009 | Chen | G01C 21/32 701/414 |
| 2009/0319163 A1* | 12/2009 | Sutter | G08G 1/0104 701/117 |
| 2010/0076675 A1* | 3/2010 | Barth | G01C 21/3469 701/532 |
| 2010/0241354 A1 | 9/2010 | Stählin | |
| 2011/0071755 A1* | 3/2011 | Ishigami | G01C 21/165 701/478.5 |
| 2011/0210867 A1* | 9/2011 | Benedikt | G08G 1/01 340/905 |
| 2012/0131084 A1* | 5/2012 | Stahlin | G09B 29/004 709/201 |

FOREIGN PATENT DOCUMENTS

| | | |
|---|---|---|
| DE | 102009045711 | 4/2010 |
| DE | 102009045817 | 4/2010 |
| JP | 2004198997 | 7/2004 |
| JP | 2006178358 | 7/2006 |
| JP | 2007065042 | 3/2007 |
| JP | 2007256196 | 10/2007 |
| WO | WO-2007142362 A1 | 12/2007 |
| WO | WO-2009056533 A1 | 5/2009 |

OTHER PUBLICATIONS

German Examination Report for German Application No. 10 720 603.9 mailed Oct. 6, 2015.
German Search Report for German Application No. 10 2010 029 073.4 mailed Apr. 14, 2011, including partial translation.
Lee, K., et al., "Taking the Louvre approach," Mar. 2009, pp. 86-92, IEEE Vehicular Technology Magazine, IEEE International Symposium on Wireless Vehicular Communications, XP011256602, ISBN: 1556-6072.
Tsuboi, T., et al., "Dual receiver communication system for DSRC," Dec. 13, 2008, pp. 459-464, 2008 Second International Conference on Future Generation Communication and Networking, IEEE, Piscataway, NJ , XP031383955, ISBN: 978-0-7695-3431-2.
Korean Office Action dated Sep. 1, 2016 for Korean Application No. 2011-7030333, including English translation, 9 pages.

* cited by examiner

DEVICE AND METHOD FOR ASSOCIATING NEW DATA WITH A DIGITAL MAP

CROSS REFERENCE TO RELATED APPLICATIONS

This application is the U.S. National Phase Application of PCT International Application No. PCT/EP2010/056807, filed May 18, 2010, which claims priority to German Patent Application No. 10 2009 003 299.1, filed May 20, 2009, the contents of such applications being incorporated by reference herein.

FIELD OF THE INVENTION

The present invention relates to a method for associating new data with a digital map which is available, preferably locally, in a vehicle and to an appropriate device.

BACKGROUND OF THE INVENTION

Modern vehicle-to-vehicle communication and vehicle-to-infrastructure communication (subsequently together called C2X) is frequently designed such that it works in the respective vehicle even without digital map material. In many cases, however, vehicles additionally use digital map material to improve the C2X functions, or digital maps are present for driver assistance systems and/or safety systems in the vehicle.

Irrespective of the C2X communication, attempts are made to improve the digital map material and hence also the reliability of driver assistance systems and safety systems in the vehicle.

The document WO 2009/56533 A1, which is incorporated by reference, discloses an assessment module for assessing data from a digital map for a vehicle, which assessment module takes measurement data from an ambient sensor system in the vehicle and/or takes map-inherent quality information as a basis for assessing data from the digital map and then transfers the assessment to a driver assistance system or a safety system in the vehicle. These systems then use the data from the digital map on the basis of the assessment.

The document DE 10 2007 003 147 A1, which is incorporated by reference, discloses a driver assistance system for a vehicle which takes a calculated level of map reliability as a basis for executing associated operations. In this context, the level of map reliability indicates the accuracy of map data in the neighborhood of the current position of the vehicle. The level of map reliability is determined by means of a complicated formula about the adjacent positions of the vehicle. This formula takes account of the positioning accuracy of the map data for the position of the vehicle, the change in data after a period of time has elapsed, and the ratio of the match between map information and the actual data.

The known devices or methods allow only an assessment of the data from existing digital maps, however. The conventional methods imperatively assume the presence of a digital map and/or of a local or global navigation system so as in each case to perform appropriate position-finding for the current position with respect to the digital map which is present in the vehicle. However, there are situations and applications which firstly do not imperatively assume a digital map, or a navigation system is not present or does not operate reliably. In such cases, the known methods cannot be used.

SUMMARY OF THE INVENTION

An aspect of the present invention proposes a way of creating or improving digital map material in the situations described above.

The invention achieves this aspect by a method for associating new data with a digital map which is available, preferably locally, in a vehicle, having the following steps: at least one new data value is received from a transmitter which is an element of a vehicle-to-vehicle communication and/or of a vehicle-to-infrastructure communication, the new data value is compared with the existing data values from the digital map, and the new data value is added to the digital map or the existing data values are updated with the new data value, in each case on the basis of the result of the comparison, wherein the result of the comparison is additionally taken as a basis for assessing the existing data values from the digital map and/or the new data value.

In particular, the method according to aspects of the invention provides for at least one new data value to be received from a transmitter which is an element of a vehicle-to-vehicle communication and/or of a vehicle-to-infrastructure communication, for the new data value to be compared with the existing data values from the digital map, and for the new data value to be added to the digital map or for the existing data value to be updated with the new data value, in each case on the basis of the result of the comparison.

The present invention therefore makes use of data resulting from a C2X communication by the respective vehicle in order to improve and create digital map material. Preferably, the digital map material is present only locally in the respective vehicle.

The approach according to aspects of the invention is a particularly simple way of creating or updating digital maps particularly for a particular area through which the vehicle frequently travels or for remote areas. This does not necessarily require a local or global navigation system. The method according to aspects of the invention includes the fresh creation of a digital map using the data transmitted by means of vehicle-to-vehicle and/or vehicle-to-infrastructure communication.

The method according to aspects of the invention for associating new data with a digital map is a first step toward a self-learning or self-correcting digital map.

Within the context of the present invention, the term "digital map" is understood to mean not only maps available in digital form for a local or global navigation system but also maps for advanced driver assistance systems (ADAS), without navigation taking place. Global navigation systems are frequently satellite navigation systems such as GPS, Galileo, GLONASS (Russia), Compass (China), IRNSS (India), etc.

By way of example, the vehicle is a motor vehicle, such as a car, bus or heavy goods vehicle, or else a rail vehicle, a ship, an aircraft, such as a helicopter or airplane, or, by way of example, a bicycle.

In one preferred exemplary embodiment, the transmitters are integrated in traffic guidance devices, for example traffic lights, road signs, display panels, or the like. This integration of the transmitter in traffic guidance devices reduces the costs of the system.

In one development of the invention, the data values involve the positions of the vehicles or of the elements of the vehicle-to-infrastructure communication, preferably including previous positions (e.g. strings of pearls), the type of the vehicles or of the elements of the vehicle-to-infrastructure communication, friction values for the road surface or for the subsurface, speeds of the vehicles or further properties of the vehicles or of the elements of the vehicle-to-infrastructure communication, for example the information from the road sign. This information is particularly well suited to creating or updating digital maps.

In a further exemplary embodiment of the invention, the comparison of the new data value with the existing data values from the digital map involves a check being performed to determine whether existing data values corresponding to the new data value are already contained in the digital map, and then, if corresponding existing data values are contained in the digital map, the new data value is compared with one or more of the values from the corresponding existing data. This is a particularly simple method in order to allow comparison of the new data value with the already existing data values from the digital map and to avoid computation errors as a result of the absence of map information or incorrect map information. The comparison may involve comparing road profiles, speed restrictions, traffic light positions, etc. for example, with existing data values.

In one particularly preferred exemplary embodiment, the result of the comparison of the new data value with the existing data values from the digital map is additionally taken as a basis for assessing the existing data values from the digital map and/or the new data value. In particular, the assessment of one or more data values from a portion of the digital map involves a reliability estimation for the data value or for the data values which is preferably stored for the respective data value and/or the respective portion of the digital map. By way of example, the reliability estimation is performed by ascertaining how often the corresponding existing data values have already been confirmed by C2X data and/or when the last confirmation took place.

The assessment of the data comprises the determination of a piece of information relating to the quality and/or relating to the validity of the data, for example. This allows the assessment of the digital map data to be used in further applications and, by way of example, to be transferred to a driver assistance system and/or a safety system in the vehicle for further use. Since the different driver assistance systems and the different safety systems in the vehicle apply different standards to the reliability of the data and require a different accuracy for the map data, for example, the data can be used in an optimum fashion for the respective driver assistance system or safety system on the basis of the assessment.

This is because to date such systems have frequently assumed that the quality of the data from the digital map is low. It is now possible for the data from the digital map to be used for a driver assistance system or a safety system to a different extent, for example, on the basis of the respective assessment. By way of example, a driver assistance system or a safety system in the vehicle can, in line with the currentness or the accuracy of the data from the digital map, take account of information from the digital map in the calculations of the driver assistance system or safety system either only to a small extent (for example when a relatively high level of currentness or accuracy of the data is required for the use) or to a relatively great extent.

During the assessment of the data from the digital map, it is possible for the data to be validated, in particular. In this context, validation is understood to mean that it is established whether the map data match the current data at all. This is advantageously done by means of a simple comparison between the new C2X data value and the data values which are present in the digital map, with discrepancies below a previously stipulatable threshold value being interpreted as inaccuracies rather than as errors. The appraisal of the accuracy of the digital data involves specifically establishing how accurate the map information actually is. Specific accuracy values are ascertained. This is advantageously done by calculating the difference between the new C2X data value and the data values which are present in the digital map. The currentness of the map data can be indicated and stored, for example, by virtue of each data value preferably being assigned a piece of time stamp information, with the time stamp containing the date of the last update for the data and possibly also the corresponding time of day.

The assessment of the data could also comprise authentication of the data. By way of example, such authentication can take place by reading an appropriate certificate with which the digital map is provided.

The above object is achieved particularly also by a device for associating new data with a digital map which is available, preferably locally, in a vehicle, having:
  a reception device for receiving at least one new data value from a transmitter which is an element of a vehicle-to-vehicle communication and/or of a vehicle-to-infrastructure communication, and
  a computation device which compares the new data value with the existing data values from the digital map and adds the new data value to the digital map or updates the existing data values with the new data value, in each case on the basis of the result of the comparison.

The reception device and the computation device are each designed such that they can perform the steps indicated above for the method, including the steps from the exemplary embodiments.

The vehicle-to-vehicle and/or vehicle-to-infrastructure communication is preferably effected by means of wireless radio transmission, particularly by means of WLAN or by means of passive and possibly also active transponders, particularly RFID chips. In addition, it is also possible to communicate via radio channels, for example UMTS. If appropriate, it is also possible to combine transmission methods, for example in order to be able to distinguish between a first and a second data value when travelling on a road.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
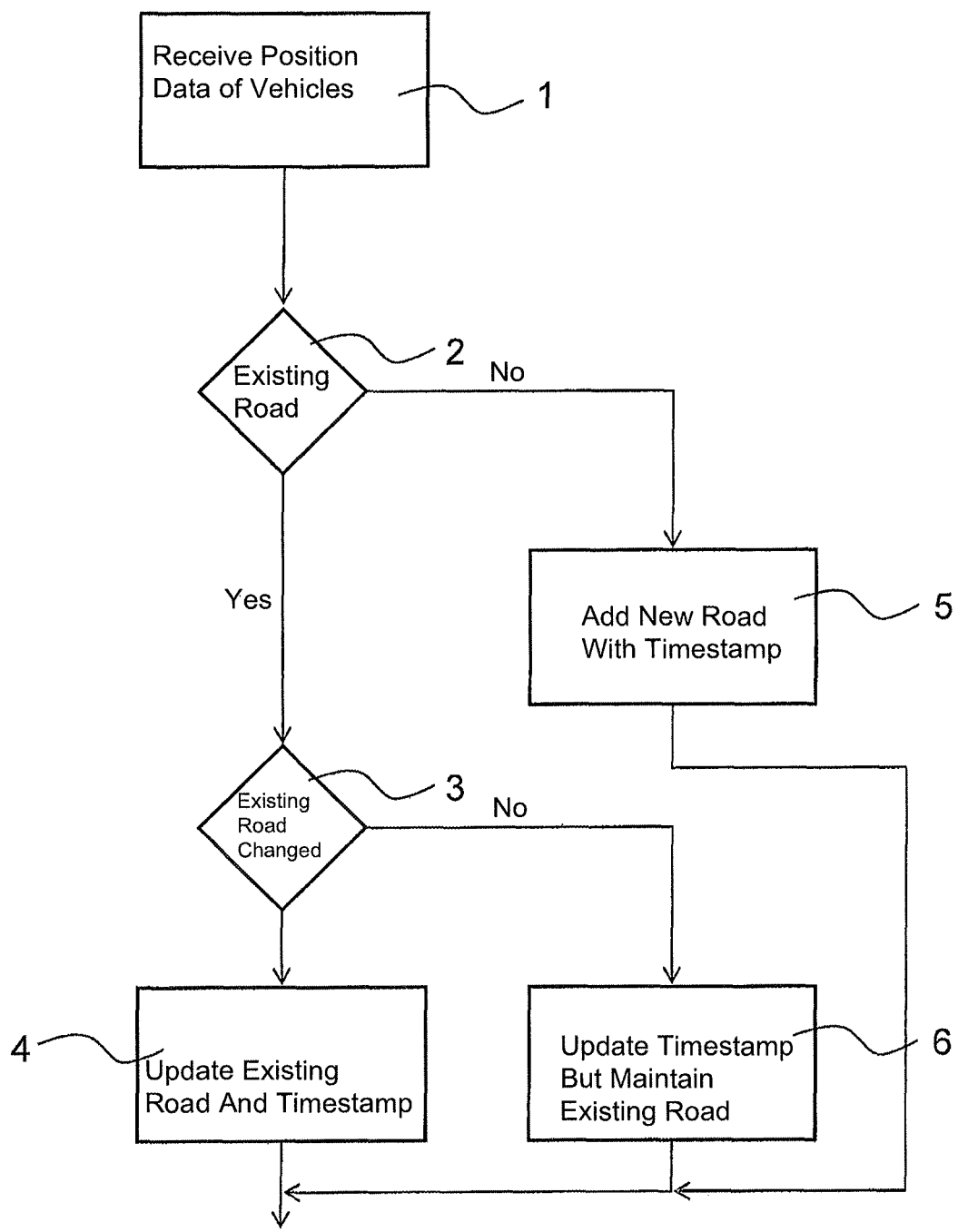
FIG. 1 shows a flowchart for a first exemplary embodiment of the present invention.
Figure 2:
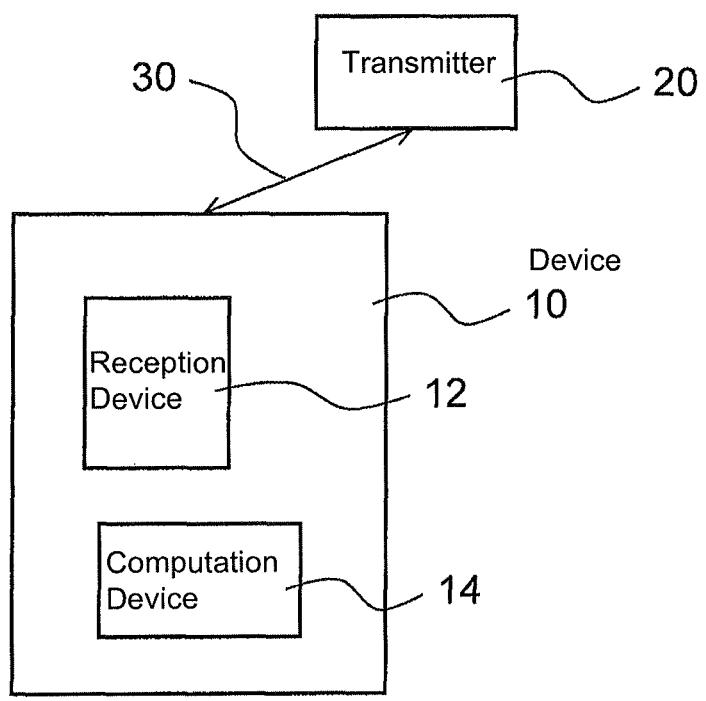
FIG. 2 shows a device according to aspects of the invention for associating new data with a digital map.

A vehicle-to-vehicle communication and/or a vehicle-to-infrastructure communication (C2X communication) 30 is used by a reception device 12 in a device 10 for associating new data with a digital map which is available locally in a vehicle (not shown) to receive position data from motor vehicles in a first step 1. These new data may be the last positions (string of pearls) of a vehicle or a number of vehicles, for example. The transmitter 20 transmitting the new data is in this case preferably integrated in a set of traffic lights or a road sign or another vehicle.

Next, a computation device 14 in the device 10 ascertains—in a step 2 of the method according to aspects of the invention—whether the region of the position data from the motor vehicles in the digital map contains a road. In this case, the digital map is stored in a data memory in the computation device 14.

If so, the computation device 14 compares—in a subsequent step 3—the new data values with the existing data from the digital map relating to the profile of the road. In this case, it is established that the profile of the road has changed slightly in comparison with the information contained in the digital map, for example as a result of a construction measure. Accordingly, the computation device 14 updates—in step 4—the data which involve the position of the road in the digital map with the position data from the vehicles.

If step 2 reveals that the position data from the vehicles do not correspond to a profile for a road, the new data are added to the digital map by the computation device 14 in step 5 as a profile for a new road.

Preferably, in step 4 or in step 5, the computation device 14 furthermore assigns to the new or updated data from the road profile a respective time stamp which corresponds to the date of the update. As a result, the driver or a driver assistance system or a safety system in the respective vehicle can tell that comparatively current data are involved.

Since the updated data are new, they are also used more frequently by a driver assistance system or a safety system in the vehicle. The relevant data are transmitted to the driver assistance system or the driving safety system in the vehicle, including the time stamp, as a result of which the systems know how current the transmitted data are.

If the comparison in step 3 establishes that the profile of the road has not changed, it does not need to be updated. Step 4 is therefore not performed. Preferably however, step 6 involves the computation device 14 assigning the current date to the existing data from the road profile as a time stamp, since the currentness of the existing data has been confirmed by the method according to aspects of the invention.

The method according to aspects of the invention can be continued after step 4, 5 or 6 with step 1, i.e. reception of new data by means of a vehicle-to-vehicle communication and/or a vehicle-to-infrastructure communication.

LIST OF REFERENCE SYMBOLS

1, 2, 3, 4, 5, 6 Steps of the method according to aspects of the invention
10 Device for associating new data
12 Reception device
14 Computation device
20 Transmitter
30 Vehicle-to-infrastructure communication

The invention claimed is:

1. A method for associating new data with a digital map which is available in a vehicle, comprising:
   receiving, by a vehicle-to-vehicle communication and/or a vehicle-to-infrastructure communication (C2X) receiver of a vehicle device, at least one new data value corresponding to a position of a vehicle, from a C2X transmitter of another vehicle or of an infrastructure device;
   comparing, by a computation device of the vehicle device, the position of the vehicle with existing data values corresponding to a position profile of an existing roadway of a digital map stored in a memory device of the vehicle device;
   adding, by the computation device, a new roadway to the digital map when the position of the vehicle does not correspond to the position profile of the existing roadway of the digital map stored in the memory device;
   updating, by the computation device, the position profile of the existing roadway of the digital map stored in the memory device with new data values indicating a new position profile of the existing roadway of the digital map stored in the memory device and updating a timestamp of the new data values, in response to the computation device determining, based on the position of the vehicle traveling on the existing roadway, that the position profile of the existing roadway of the digital map stored in the memory device has changed;
   maintaining, by the computation device, the position profile of the existing roadway of the digital map stored in the memory device and updating a timestamp of the existing data values in response to the computation device determining, based on the position of the vehicle traveling on the existing roadway, that the position profile of the existing roadway of the digital map stored in the memory device has not changed;
   transmitting, by the computation device, at least one of the new roadway, the updated position profile of the existing roadway and the timestamp to at least one of a driver assistance system of the vehicle and a driver safety system of the vehicle; and
   using, by the computation device, a result of the comparison as a basis for an assessment of the existing data values from the digital map and/or the new data value, wherein the assessment of one or more data values from a portion of the digital map includes a reliability estimation for the data values which is stored for the respective data value or the respective portion of the digital map.

2. The method as claimed in claim 1, wherein the digital map which is available locally.

3. The method as claimed in claim 1, wherein the transmitters are integrated in traffic guidance devices.

4. The method as claimed in claim 3, wherein the traffic guidance devices are selected from the group consisting of traffic lights, road signs and display panels.

5. The method as claimed in claim 1, wherein the data values include the positions of the elements of the vehicle-to-infrastructure communication or of other vehicles, including at least one of previous positions, the type of the vehicles or of the elements of the vehicle-to-infrastructure communication, friction values for the road surface or for the subsurface, the speed of the vehicles or further properties of the vehicles or of the elements of the vehicle-to-infrastructure communication.

6. The method as claimed in claim 5, wherein the data values are based on information from a road sign.

7. The method as claimed in claim 1, wherein the comparison of the new data value with the existing data values from the digital map includes a check being performed to determine whether existing data values corresponding to the new data value are already contained in the digital map, and then, if corresponding existing data values are contained in the digital map, the new data value is compared with one or more of the values from the corresponding existing data.

8. A device for associating new data with a digital map which is available in a vehicle, comprising:
   a reception device including a vehicle-to-vehicle communication and/or a vehicle-to-infrastructure communication (C2X) receiver of a vehicle device for receiving at least one new data value corresponding to a position of a vehicle, from a C2X transmitter of another vehicle or of an infrastructure device; and a computation device including a processor which:

compares the position of the vehicle with existing data values corresponding to a position profile of an existing roadway of a digital map stored in a memory device of the vehicle device, adds a new roadway to the digital map when the position of the vehicle does not correspond to the position profile of the existing roadway of the digital map stored in the memory device, updates the position profile of the existing roadway of the digital map stored in the memory device with new data values indicating a new position profile of the existing roadway of the digital map stored in the memory device and updates a timestamp of the new data values, in response to the computation device determining, based on the position of the vehicle traveling on the existing roadway, that the position profile of the existing roadway of the digital map stored in the memory device has changed, maintains the position profile of the existing roadway of the digital map stored in the memory device and updating a timestamp of the existing data values in response to the position of the computation device determining, based on the position of the vehicle traveling on the existing roadway, that the position profile of the existing roadway of the digital map stored in the memory device has not changed;

transmitting, by the computation device, at least one of the new roadway, the updated position profile of the existing roadway and the timestamp to at least one of a driver assistance system of the vehicle and a driver safety system of the vehicle; and using, by the computation device, a result of the comparison as a basis for an assessment of the existing data values from the digital map and/or the new data value, wherein the assessment of one or more data values from a portion of the digital map includes a reliability estimation for the data values which is stored for the respective data value or the respective portion of the digital map.

9. The device as claimed in claim 8, wherein the digital map which is available locally.

10. The device as claimed in claim 8, wherein the transmitters are integrated in traffic guidance devices.

11. The device as claimed in claim 10, wherein the traffic guidance devices are selected from the group consisting of traffic lights, road signs and display panels.

12. The device as claimed in claim 8, wherein the data values include the positions of the elements of the vehicle-to-infrastructure communication or of other vehicles, including at least one of previous positions, the type of the vehicles or of the elements of the vehicle-to-infrastructure communication, friction values for the road surface or for the subsurface, the speed of the vehicles or further properties of the vehicles or of the elements of the vehicle-to-infrastructure communication.

13. The device as claimed in claim 12, wherein the data values are based on information from a road sign.

14. The device as claimed in claim 8, wherein the computation device, when comparing the new data value with the existing data values from the digital map, checks whether existing data values corresponding to the new data value are already contained in the digital map, and then, if corresponding existing data values are contained in the digital map, compares the new data value with one or more of the values from the corresponding existing data.

* * * * *